(12) United States Patent
Kim et al.

(10) Patent No.: US 9,529,229 B2
(45) Date of Patent: Dec. 27, 2016

(54) BACKLIGHT UNIT AND DISPLAY DEVICE HAVING THE SAME

(71) Applicant: Samsung Display Co., Ltd., Yongin, Gyeonggi-do (KR)

(72) Inventors: Jeong-Ki Kim, Daejeon (KR); Jin-Soo Shin, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 338 days.

(21) Appl. No.: 14/013,138

(22) Filed: Aug. 29, 2013

(65) Prior Publication Data

US 2014/0063408 A1    Mar. 6, 2014

(30) Foreign Application Priority Data

Sep. 5, 2012  (KR) .................. 10-2012-0098470

(51) Int. Cl.
*G02F 1/1335* (2006.01)
*F21V 23/00* (2015.01)
*F21V 23/06* (2006.01)
*F21V 8/00* (2006.01)

(52) U.S. Cl.
CPC ....... *G02F 1/133608* (2013.01); *F21V 23/001* (2013.01); *F21V 23/06* (2013.01); *G02B 6/009* (2013.01); *G02B 6/0068* (2013.01); *G02B 6/0073* (2013.01); *G02B 6/0083* (2013.01); *G02F 1/133621* (2013.01)

(58) Field of Classification Search
CPC ................................ G02F 1/133603
USPC ........................................ 349/58
See application file for complete search history.

(56) References Cited

U.S. PATENT DOCUMENTS

| 7,714,497 | B2 | 5/2010 | Haga et al. | |
|---|---|---|---|---|
| 7,789,529 | B2 | 9/2010 | Roberts et al. | |
| 2008/0284946 | A1* | 11/2008 | Abe et al. | 349/68 |
| 2009/0310335 | A1* | 12/2009 | Park | 362/97.1 |
| 2009/0310339 | A1* | 12/2009 | Jung | G02F 1/133603 362/97.3 |
| 2009/0323334 | A1* | 12/2009 | Roberts et al. | 362/247 |
| 2011/0316005 | A1* | 12/2011 | Murao et al. | 257/84 |

(Continued)

FOREIGN PATENT DOCUMENTS

| KR | 1020090054749 | 6/2009 |
|---|---|---|
| KR | 1020090073458 | 7/2009 |

*Primary Examiner* — Paisley L Arendt
*Assistant Examiner* — Edmond Lau
(74) *Attorney, Agent, or Firm* — F. Chau & Associates, LLC (57) ABSTRACT

A backlight unit includes a substrate, a plurality of first light sources, a plurality of second light sources, a first wiring portion, a second wiring portion, a first connector and a second connector. The first light sources are disposed on the substrate. The second light sources are disposed on the substrate in a single line. The first wiring portion extends along a length direction on a first peripheral area of the substrate and is connected to the first light sources. The second wiring portion extends along the length direction on a second peripheral area of the substrate and is connected to the second light sources. The first connector is disposed on a first end portion of the substrate and is electrically connected to the first wiring portion. The second connector is disposed on a second end portion of the substrate and is electrically connected to the second wiring portion.

23 Claims, 7 Drawing Sheets

(56) References Cited

U.S. PATENT DOCUMENTS

2012/0087122 A1* 4/2012 Takeuchi et al. ............. 362/235
2012/0206942 A1* 8/2012 Bae ..................... G02B 6/0031
                                                        362/632

* cited by examiner

BACKLIGHT UNIT AND DISPLAY DEVICE HAVING THE SAME

CROSS-REFERENCE TO RELATED APPLICATIONS

This application claims priority to Korean Patent Application No. 10-2012-0098470, filed on Sep. 5, 2012, the disclosure of which is hereby incorporated by reference in herein in its entirety.

TECHNICAL FIELD

Exemplary embodiments of the present invention relate to a backlight unit and a display device having the backlight unit. More particularly, exemplary embodiments of the present invention relate to a backlight unit having a slim structure and a display device having the backlight unit.

DISCUSSION OF THE RELATED ART

A liquid crystal display device is a non-emissive type display device, so that the liquid crystal display device may require a light source such as a backlight unit to supply a backside of a liquid crystal display panel of the liquid crystal display device with light.

Recently, a plurality of light-emitting diodes (LEDs) as the light source has been used in a backlight unit. For one example, a red LED, a green LED and a blue LED.

For example, a conventional backlight unit includes a first substrate, a first light source installed on the first substrate to generate first lights, a second substrate, and a second light source installed on the second substrate to generate second lights. The first lights and the second lights are mixed to form white lights.

As a conventional backlight unit may require two substrates (e.g., a first substrate and a second substrate), a thickness of the backlight unit is increased. An increasing of the thickness of the backlight unit means that a bezel may be increased. Further, when a thickness of the first substrate and a thickness of the second substrate are decreased, wirings may be complexly configured so that the reliability of a backlight unit may be decreased.

SUMMARY

Exemplary embodiments of the present invention provide a backlight unit capable of securing design reliability to decrease a width of a substrate thereof.

Exemplary embodiments of the present invention also provide a display device including the above-mentioned backlight unit.

According to an exemplary embodiment of the present invention, a backlight unit includes a substrate, a plurality of first light sources, a plurality of second light sources, a first wiring portion, a second wiring portion, a first connector and a second connector. The substrate extends along a length direction. The first light sources are disposed on the substrate in a single line. The second light sources are disposed on the substrate in a single line and arranged alternatively with the first light sources. The first wiring portion extends along the length direction on a first peripheral area of the substrate and is connected to the first light sources. The second wiring portion extends along the length direction on a second peripheral area of the substrate and is connected to the second light sources. The first connector is disposed on a first end portion of the substrate and electrically connected to the first wiring portion. The second connector is disposed on a second end portion of the substrate and electrically connected to the second wiring portion.

In an exemplary embodiment, the first light sources and the second light sources may be disposed on the first peripheral area and the second peripheral area, respectively.

In an exemplary embodiment, the number of pins corresponding to the first connector may be different from the number of pins corresponding to the second connector.

In an exemplary embodiment, the number of pins corresponding to the first connector may be greater than the number of pins corresponding to the second connector.

In an exemplary embodiment, the number of pins corresponding to the first connector may be increased in proportion to the numbers of the first light sources, and the number of pins corresponding to the second connector may be increased in proportion to the numbers of the second light sources.

In an exemplary embodiment, the number of the first light sources may be integer multiple of the number of pins of the first connector, and the number of the second light sources may be integer multiple of the number of pins of the second connector.

In an exemplary embodiment, the substrate may include a first connector protruding portion and a second connector protruding portion. Each of the first connector and the second connector may be disposed on the first connector protruding portion and the second connector protruding portion, respectively, such that the first connector and the second connector protrude from the substrate.

In an exemplary embodiment, the first light sources are the first and last light sources in a row on the substrate on which the first light sources and the second light sources are disposed.

In an exemplary embodiment, the first light source may emit magenta lights, and the second light source may emit green lights.

In an exemplary embodiment, one of the first wiring portion and the second wiring portion may include a plurality of main wirings and a plurality of sub-wirings.

The sub-wirings may connect the first light sources to each other or connect the second light sources to each other in a serial manner.

According to an exemplary embodiment of the present invention, a display device includes a top chassis, a liquid crystal display panel, a bottom chassis and a backlight unit. The liquid crystal display panel is configured to display an image. The bottom chassis is combined with the top chassis to receive the liquid crystal display panel. The backlight unit is disposed on at least one of a bottom portion, plural side wall portion and a side wall portion of the bottom chassis. The backlight unit includes a substrate, a plurality of first light sources, a plurality of second light sources, a first wiring portion, a second wiring portion, a first connector and a second connector. The substrate extends along a length direction. The first light sources are disposed on the substrate in a single line. The second light sources are disposed on the substrate in a single line and arranged alternatively with the first light sources. The first wiring portion extends along the length direction on a first peripheral area of the substrate and is connected to the first light sources. The second wiring portion extends along the length direction on a second peripheral area of the substrate and is connected to the second light sources. The first connector is disposed on a first end portion of the substrate and is electrically connected to the first wiring portion. The second connector is disposed on a second end portion of the substrate and is electrically connected to the second wiring portion.

In an exemplary embodiment, the bottom chassis may be combined with a first connector and a second connector of the backlight unit, respectively. The bottom chassis may further include a first socket and a second socket that are disposed at two corners of side wall part of the bottom chassis.

In an exemplary embodiment, a substrate of the backlight unit may include a first connector protruding portion and a second connector protruding portion. Each of the first connector and the second connector may be disposed on the first connector protruding portion and the second connector protruding portion, respectively, and the first connector and the second connector may protrude from the substrate. The first socket and the second socket of the bottom chassis may be recessed from a bottom surface of the bottom chassis.

In an exemplary embodiment, the backlight unit may be disposed on a side wall portion of the bottom chassis having a long side.

In an exemplary embodiment, the number of pins corresponding to the first connector of the backlight unit may be greater than the number of pins corresponding to the second connector of the backlight unit.

In an exemplary embodiment, the number of the first light sources may be integer multiple of the number of pins of the first connector, and the number of the second light sources may be integer multiple of the number of pins of the second connector.

In an exemplary embodiment, in a row on which the first light sources and the second light sources are disposed, first and last light sources on the row may be the first light source.

In an exemplary embodiment, the first light source may emit magenta lights, and the second light source may emit green lights.

In an exemplary embodiment, one of the first wiring portion and the second wiring portion may include a plurality of main wirings and a plurality of sub-wirings. The sub-wirings may connect the first light sources to each other or connect the second light sources to each other in a serial manner.

In accordance with an exemplary embodiment of the present invention, a backlight unit is provided. The backlight unit includes a substrate extending along a length direction, wherein the substrate includes a first peripheral area, a second peripheral area and a light source area, a plurality of first light sources disposed on the light source area of the substrate in a single line, a plurality of second light sources disposed on the light source area of the substrate in a single line and arranged alternatively with the first light sources.

The backlight unit further includes a first wiring portion disposed on the first peripheral area of the substrate, wherein the first wiring portion includes a plurality of first main wirings extending along the length direction of the first peripheral area and a plurality of first sub-wirings electrically connected to the first main wirings and the first light sources, wherein the first light sources are electrically connected to the first sub-wirings through a plurality of first connection pads, and a second wiring portion disposed on the second peripheral area of the substrate, wherein the second wiring portion includes a plurality of second main wirings extending along the length direction of the second peripheral area and a plurality of second sub-wirings electrically connected to the second main wirings and the second light sources, wherein the second light sources are electrically connected to the second sub-wirings through a plurality of second connection pads.

In addition, the backlight unit further includes a first connector disposed on a first end portion of the substrate and electrically connected to the first wiring portion through a first connector connection part and a second connector disposed on a second end portion of the substrate and electrically connected to the second wiring portion through a second connector connection part.

According to exemplary embodiments of the present invention, different kinds of light sources are disposed on one substrate in a single line and arranged alternatively with each other, so that a backlight unit of the substrate having a slim width may be manufactured.

Moreover, it is designed that the number of pins of the first connector is different from that of pins of the second connector, so that a miss-assembling which may be generated in an assembly process of the backlight unit may be prevented.

BRIEF DESCRIPTION OF THE DRAWINGS

Exemplary embodiments of the present invention can be understood in more detail from the following detailed description taken in conjunction with the accompanying drawings, in which.

DETAILED DESCRIPTION OF EXEMPLARY EMBODIMENTS OF THE INVENTION

Hereinafter, exemplary embodiments of the present invention will be explained in detail with reference to the accompanying drawings.

In the drawings, the thickness of layers, films, panels, regions, etc., may be exaggerated for clarity. It will be understood that when an element is referred to as being "on" another element, it can be directly on the other element or an intervening element or elements may also be present. Like reference numerals designate like elements throughout the specification.

As used herein, the singular forms, "a", "an", and "the" are intended to include plural forms as well, unless the context clearly indicates otherwise.

Figure 1:
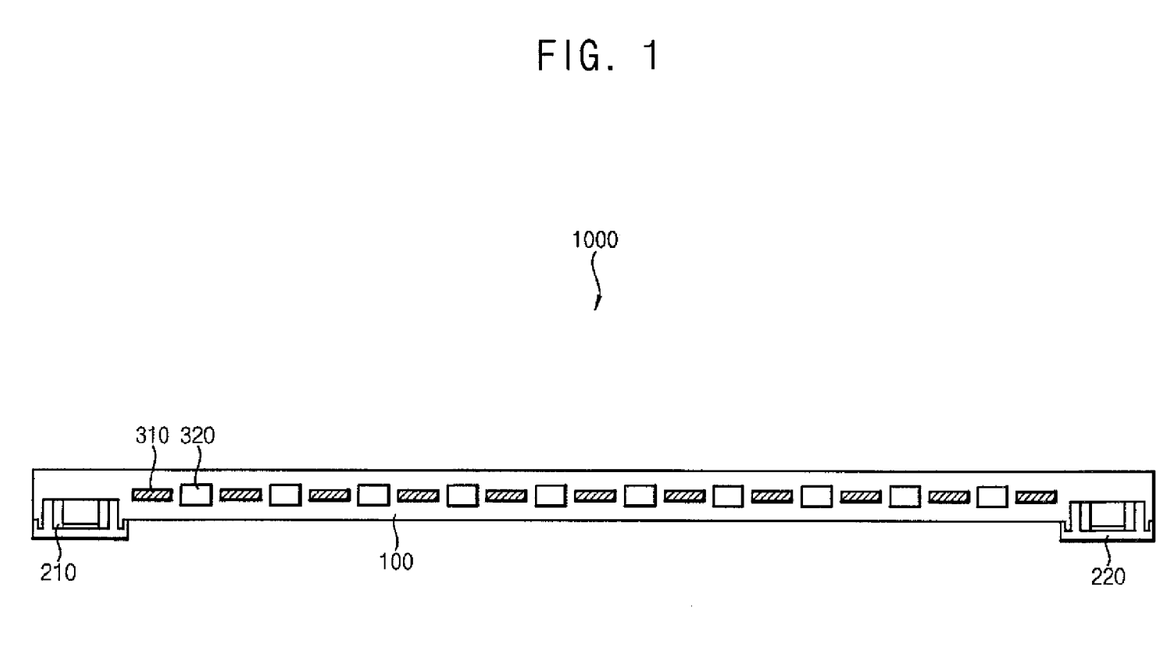
FIG. 1 is a plan view illustrating a backlight unit according to an exemplary embodiment of the present invention.

FIG. 1 is a plan view illustrating a backlight unit according to an exemplary embodiment of the present invention.

Referring to FIG. 1, a backlight unit 1000 according to an exemplary embodiment of the present invention includes, for example, a substrate 100, a plurality of first light sources 310, a plurality of second light sources 320, a first wiring portion, a second wiring portion, a first connector 210 and a second connector 220. The substrate 100 is extended in, for example, a length direction thereof. The first light sources 310 are disposed on the substrate 100 in, for example, a single line. The second light sources 320 are disposed on the substrate 100 in a single line to be arranged alternatively with the first light sources 310. The first wiring portion is formed on the substrate 100 on which the first and second light sources 310 and 320 are formed. The first wiring portion is extended to a first peripheral area of the substrate 100 to be electrically connected to the first light sources 310. The second wiring portion is formed on the substrate 100 on which the first and second light sources 310 and 320 are formed. The second wiring portion is extended to a second peripheral area of the substrate 100 to be electrically connected to the second light sources 320. The first connector 210 is disposed at a first end portion of the substrate 100 to be electrically connected to the first wiring portion, and the second connector 220 is disposed at a second end portion of the substrate 100 to be electrically connected to the second wiring portion.

In the present exemplary embodiment, the first light sources 310 and the second light sources 320 are disposed on the substrate 100 in, for example, an alternating manner. Lights emitted from the first light sources 310 are mixed with lights emitted from the second light sources 320 to form white light. The first light source 310 may be first light source and the last light sources that are disposed on the substrate 100. The first light source 310 may be positioned, for example, at two end portions of the substrate 100 to prevent a color deviation from being generated at two end portions of the substrate 100. The first light sources 310 may emit, for example, a magenta light, and the second light source 320 may emit, for example, a green light. The magenta light emitted from the first light source 310 and the green light emitted from the second light sources 320 are mixed with each other to form a white light, but the present invention will not be limited to this.

Figure 2A:
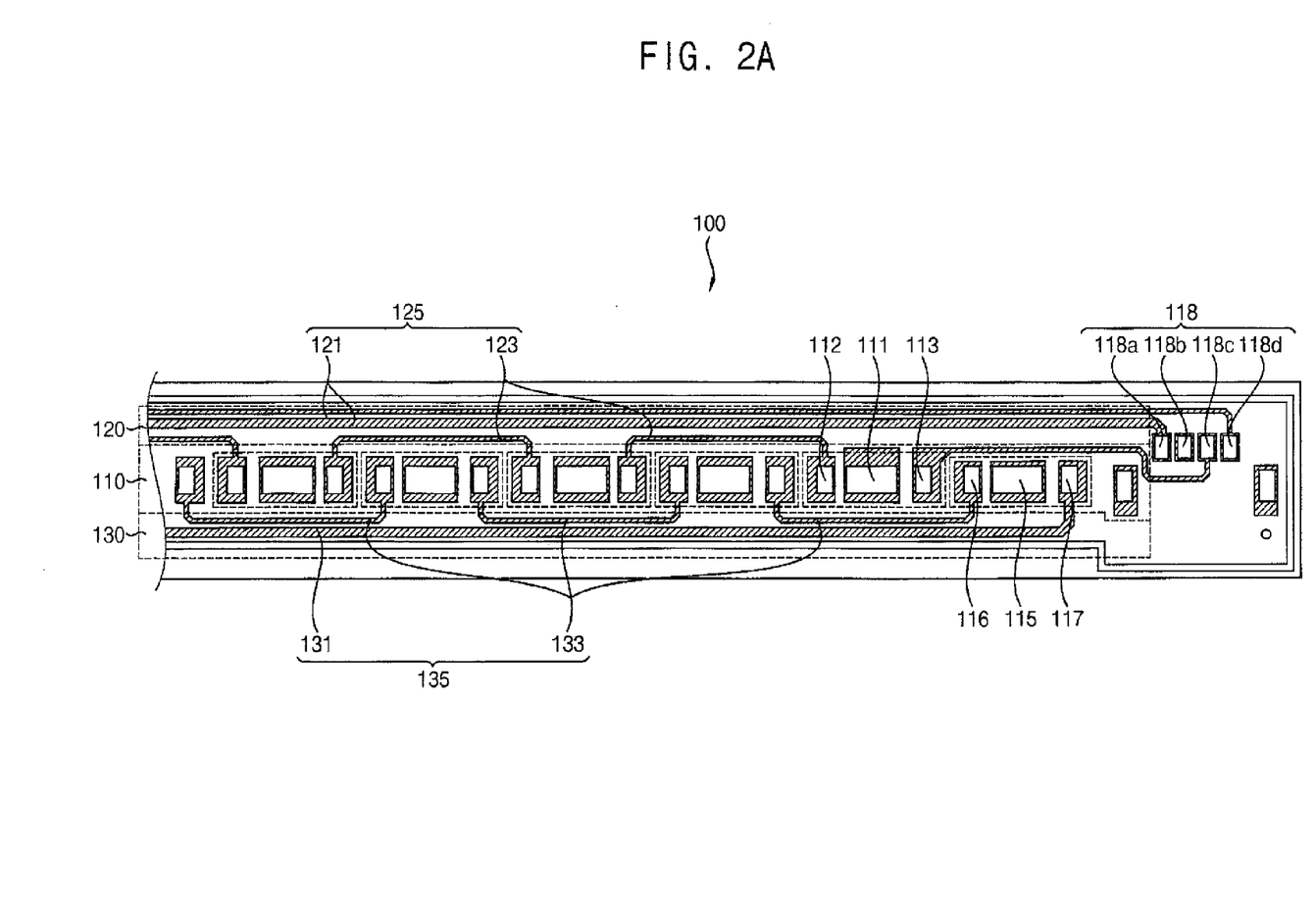
FIG. 2A is a partial perspective view illustrating one portion of a substrate of the backlight unit of FIG. 1.

FIG. 2A is a partial perspective view illustrating one portion of a substrate of the backlight unit of FIG. 1. For convenience of description, a wiring portion of the substrate 100 is described in FIG. 2A.

Referring to FIG. 2A, the substrate 100 includes, for example, a first wiring portion 135 and a second wiring portion 125. The first wiring portion 135 is electrically connected to the first light sources 310, and the second wiring portion 125 is electrically connected to the second light sources 320. The second wiring portion 125 is electrically connected to the second connector 220 through a second connector part 118.

The first wiring portion 135 and the second wiring portion 125 are disposed on the substrate 100. The first wiring portion 135 is positioned, for example, at a first peripheral area 130, and the second wiring portion 125 is positioned, for example, at a second peripheral area 120. The first and second peripheral areas 130 and 120 are, for example, different from each other with respect to the first and second light sources 310 and 320. For example, when the first peripheral area 130 is positioned at an upper portion of the first and second light sources 310 and 320 when viewed from a plan view, the second peripheral area 120 may be positioned at a lower portion of the first and second light sources 310 and 320 when viewed from a plan view. As the first and second peripheral areas 130 and 120 are positioned at the different areas, a wiring structure may be simple and the positioning of the first and second peripheral areas 130 and 120 may also prevent the width of the substrate 100 from being increased.

Figure 2B:
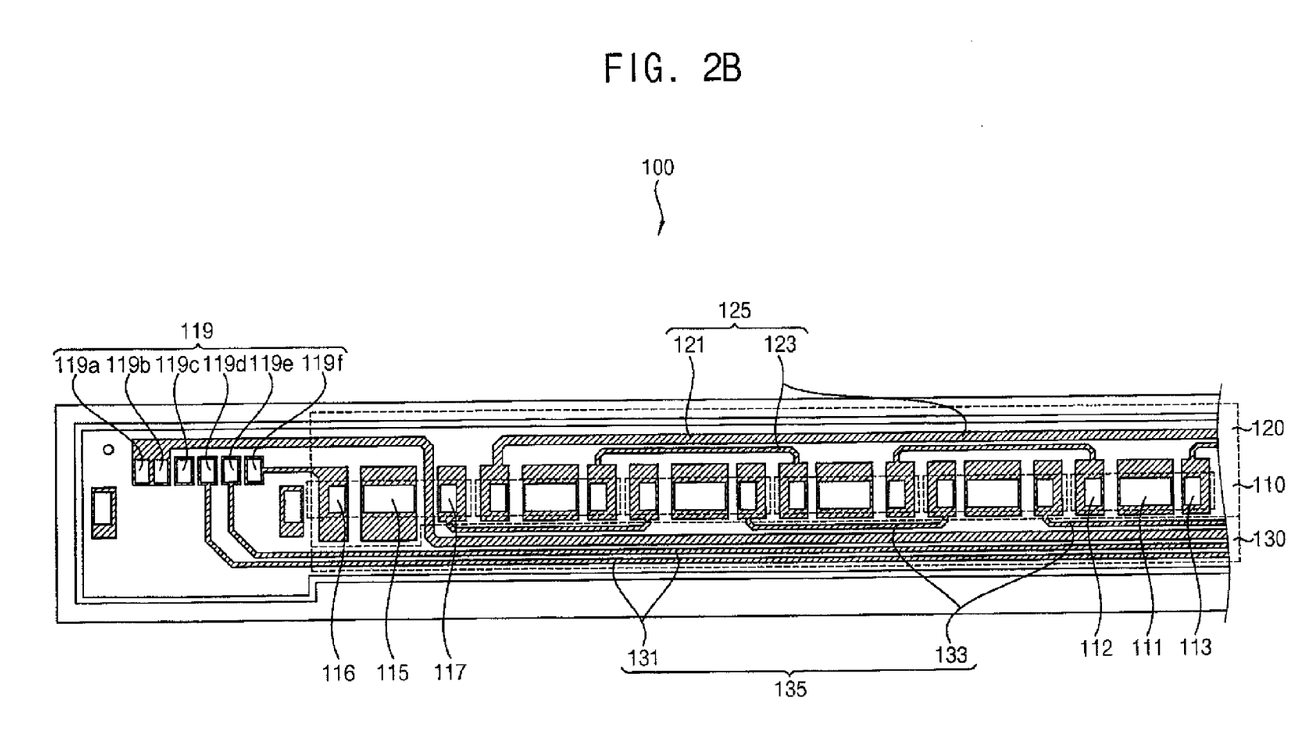
FIG. 2B is a partial perspective view illustrating another portion of a substrate of the backlight unit of FIG. 1.

FIG. 2B is a partial perspective view illustrating another portion of a substrate of the backlight unit of FIG. 1. For convenience of description, a wiring portion of the substrate 100 is described in FIG. 2B.

Referring to FIG. 2B, the substrate 100 includes, for example, the first wiring portion 135 and the second wiring portion 125. The first wiring portion 135 is electrically connected to the first light sources 310, and the second wiring portion 125 is electrically connected to the second light sources 320. The first wiring portion 135 is electrically connected to the first connector 210 through a first connector part 119.

As described above, the first wiring portion 135 and the second wiring portion 125 are disposed on the different areas of the substrate 100. Referring to FIG. 2B, the substrate 100 includes, for example, a light source area 110, a first peripheral area 130 and a second peripheral area 120. The first wiring portion 135 is positioned, for example, at the first peripheral area 130, and the second wiring portion 125 is positioned, for example, at the second peripheral area 120. The first and second peripheral areas 130 and 120 are, for example, different from each other with respect to a light source area 110 on which the first and second light sources 310 and 320 are positioned. Referring to FIG. 2B, the second peripheral area 120 is positioned, for example, on an upper portion of the light source area 110, and the first peripheral area 130 is positioned, for example, on a lower portion of the light source area 110.

Referring again to FIGS. 2A and 2B, the first wiring portion 135 includes, for example, a plurality of main wirings 131 and a plurality of sub-wirings 133. The main wirings 131 are disposed along a length direction of the substrate 100, and the sub-wirings 133 are electrically connected to the main wirings 131 and the first light sources 310, respectively. The first light sources 310 are electrically connected to the sub-wirings 133 through the connection pads 112, 111 and 113. That is, the first wiring portion 135 may connect the first light sources 310 to each other, for example, in a serial manner.

The second wiring portion 125 includes, for example, a plurality of main wirings 121 and a plurality of sub-wirings 123. The main wirings 121 are disposed along, for example, a length direction, and the sub-wirings 123 are electrically connected to the main wiring 121 and the second light sources 320. The second light sources 320 and the sub-wirings 123 are electrically connected to each other through connection pads 115, 116 and 117. That is, the second wiring portion 125 may connect the second light sources 320 to each other in, for example, a serial manner.

In an exemplary embodiment, the first light sources 310 and the second light sources 320 may each include, for example, light emitting diodes (LED's). Alternatively, in an exemplary embodiment, the first light sources 310 and the second light sources 320 may each include a CCFL (Cold Cathode Fluorescent Lamp).

The first connector 210 is electrically connected to a first connector connection part 119 formed on the substrate 100. The connector connection part 119 includes, for example, a plurality of connector pads 119a, 119b, 119c, 119d, 119e and 119f. In this case, the number of the connector pads is, for example, six but exemplary embodiments of the present invention are not limited thereto. The second connector 220 is electrically connected to a second connector connection part 118 formed on the substrate 100. The second connector connection part 118 includes, for example, a plurality of connector pads 118a, 118b, 118c and 118d. In this case, the number of the connector pads is, for example, four but exemplary embodiments of the present invention are not limited thereto. Alternatively, the first connector connection part 119 and second connector connection part 118 may be manufactured to have a various number of connector pads.

The number of pins of the first connector 210 may be, for example, different from that of pins of the second connector 220. When the number of pins of the first connector 210 is different from that of pins of the second connector 220, a miss-assembling may be prevented. Moreover, in a process of disposing the first light source 310 at two end portions of the substrate 100, the number of the first light sources 310 may, for example, be greater than that of the second light sources 320. Thus, it is designed that the number of the first connector 210 is, for example, greater than that of the second connector 220, so that the number of wirings may be increased.

Moreover, the number of first connector 210 may be determined in connection with the number of the first light sources 310. The number of the first connectors 210 may, for example, be related to the number of main wirings 131 of the first wiring portion 135 delivering power to the first light sources 310. As the number of pins of the first connector 210 is increased, the number of main wiring 131 of the first wiring portion 135 which is capable of being designed on the substrate 100 is also increased. Likewise, the number of second connector 220 may be determined, for example, in connection with the number of the second light sources 320. The number of the second connectors 220 may, for example, be delivering power to the second light sources 320. As the number of pins of the second connector 220 is increased, the number of main wiring 121 of the second wiring portion 125 which is capable of being designed on the substrate 100 is also increased. Thus, the number of the first light sources 310 and the number of the first connector 220 may, for example, be determined in relationship with integer multiple, and the number of second light sources 320 and the number of second connector 210 may be determined in relationship with integer multiple.

However, when the number of main wirings 131 of the first wiring portion 135 and the number of main wirings 121 of the second wiring portion 125 are great, a width of the substrate 100 may be increased. Thus, the number of main wirings 121 and 131, the number of first connector 210 and the number of second connector 220 should be determined to have wiring numbers suitable for the numbers of the first and second light sources 210 and 220.

Figure 3A:
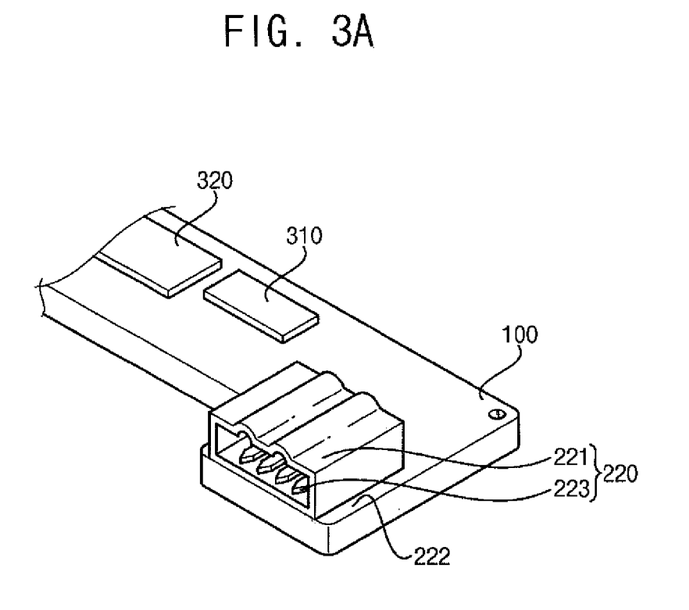
FIG. 3A is a perspective view schematically illustrating one portion of the backlight unit of FIG. 2.

FIG. 3A is a perspective view schematically illustrating one portion of the backlight unit of FIG. 2. For convenience of description, a portion of the second connector 220 of the backlight unit according to the present exemplary embodiment is described in FIG. 3A.

Referring to FIG. 3A, the backlight unit includes, for example, a substrate 100, a first light source 310, a second light source 320 and a second connector 220. Plural first light sources 310 and plural second light sources 320 are disposed on the first substrate 100, and the second connector 220 is formed at a first end portion of the substrate 100. Plural wirings (not shown) electrically connect to the first and second light sources 310 and 320 and the second connector 220. The second connector 220 includes, for example, a housing part 221 and a pin part 223 so as to connect with an external device (not shown). In the present exemplary embodiment, the number of pins of the pin part 223 of the second connector 220 is, for example, four but exemplary embodiments of the present invention are not limited thereto. Alternatively, the pin part 223 of the second connector 220 may be manufactured to have a various number of pins.

The substrate 100 may further include, for example, a second connector protruding portion 222. The second connector 220 is disposed, for example, on the second connector protruding portion 222 to be protruded from the substrate 100. When the second connector 220 is disposed to be protruded from the substrate 100, the backlight unit may be readily combined with an external device (not shown).

Figure 3B:
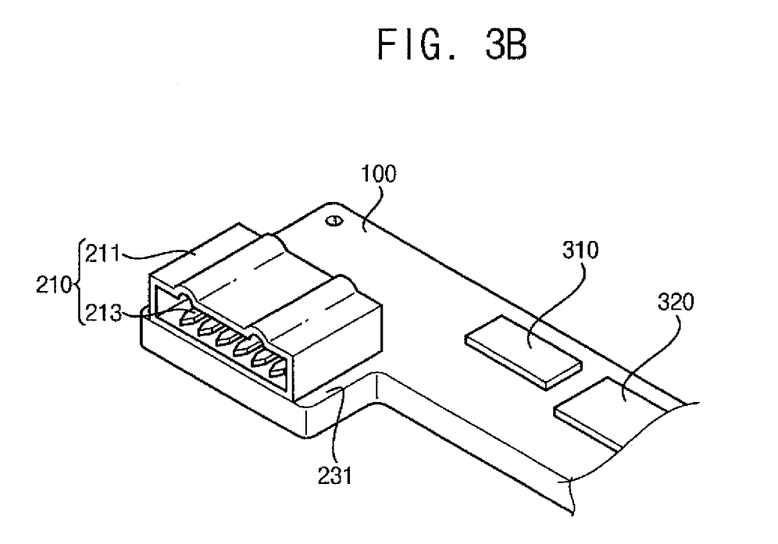
FIG. 3B is a perspective view illustrating another portion of the backlight unit of FIG. 1.

FIG. 3B is a perspective view illustrating another portion of the backlight unit of FIG. 1. For convenience of description, a portion of the first connector 210 of the backlight unit according to the present exemplary embodiment is described in FIG. 3B.

Referring to FIG. 3B, structures and functions of the first connector 210 are substantially the same as those of the second connector 220 described with reference to FIG. 3A, and thus any repetitive detailed explanation may hereinafter be omitted.

The first connector 210 includes, for example, a housing part 211 and a pin part 213 so as to connect with an external device (not shown). In the present exemplary embodiment, the number of pins of the pin part 213 of the first connector 210 is, for example, six but exemplary embodiments of the present invention are not limited thereto. Alternatively, the pin part 213 of the first connector 210 may be manufactured to have a various number of pins. The substrate 100 may further include, for example, a first connector protruding portion 231. The first connector 210 is disposed on, for example, the first connector protruding portion 231 to be protruded from the substrate 100. When the first connector 210 is disposed, for example, to be protruded from the substrate 100, the backlight unit may be readily combined with an external device (not shown).

Figure 4:
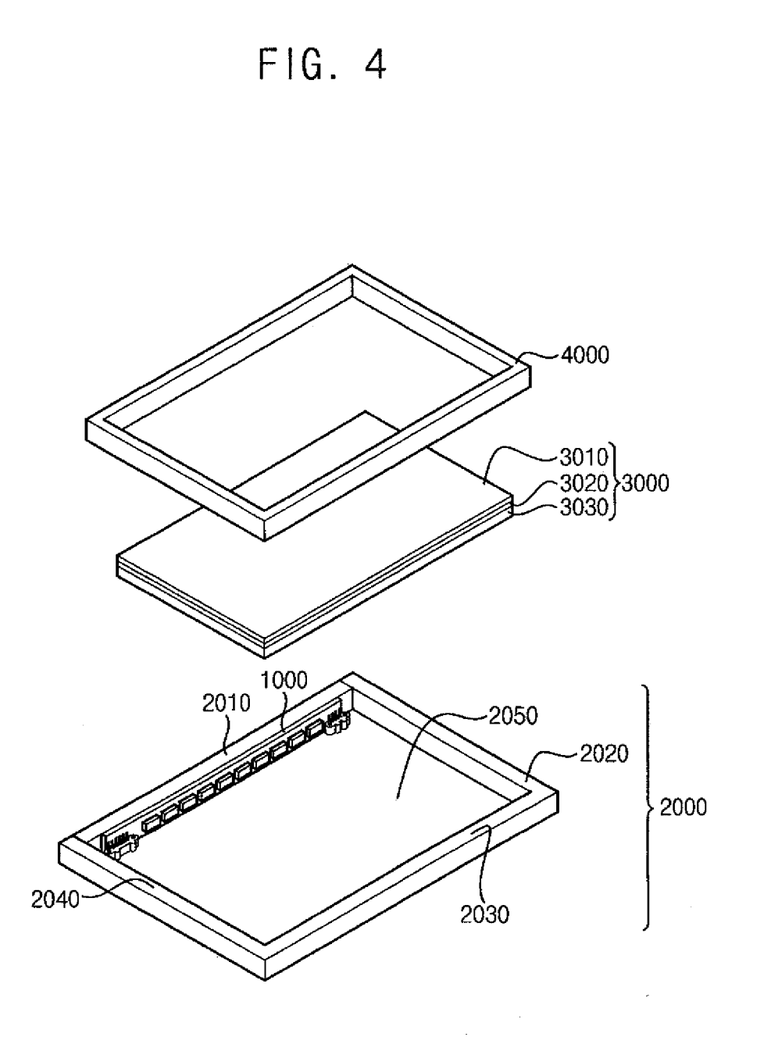
FIG. 4 is an exploded perspective view illustrating a display device according to an exemplary embodiment of the present invention.

FIG. 4 is an exploded perspective view illustrating a display device according to an exemplary embodiment of the present invention.

Referring to FIG. 4, a display device according to the present exemplary embodiment includes, for example, a top chassis 4000, a liquid crystal display panel 3000, a backlight unit 1000 and a bottom chassis 2000. The liquid crystal display panel 3000 includes, for example, a first substrate 3010, a second substrate 3030 and a liquid crystal layer 320 between the first substrate 3010 and the second substrate 3030 to display an image. In an exemplary embodiment, the first substrate 3010 and the second substrate 3030 of the liquid crystal display panel 3000, may each be formed of, for example, transparent glass, quartz or plastic. Further, in an exemplary embodiment, the glass may include, for example, tempered glass. In an exemplary embodiment, the first substrate 3010 and the second substrate 3030 of the liquid crystal display panel 3000 may each be formed of, for example, one of polycarbonate (PC), polyester (PET), polypropylene (PP), polyethylene (PE) and polymethyl methacrylate (PMMA).

The top chassis 3030 is combined with the bottom chassis 2000 to form an exterior of the display device.

The bottom chassis 2000 includes, for example, a bottom portion 2050 and a plurality of side wall portions 2010, 2020, 2030 and 2040 to be combined with the top chassis 4000 to receive the liquid crystal panel 3000. For example, in an exemplary embodiment, both the top chassis 4000 and the bottom chassis 2000 may be made of highly thermal conductive material such as aluminum (Al), Stainless Steel or Steel, Electrogalvanized, Cold Rolled, Coil (SECC). In an exemplary embodiment, the top chassis 4000 and the bottom chassis 2000 are made of the same material as each other. Alternatively, in an exemplary embodiment, the bottom chassis 2000 and the top chassis 4000 may be formed of different materials than each other.

The backlight unit 1000 is installed at least one of the side wall portions 2010, 2020, 2030 and 2040 of the bottom chassis 2000.

The backlight unit 1000 of the present exemplary embodiment is substantially the same as the backlight unit of FIGS. 1 and 2A-2B. Referring again to FIGS. 1 and 2A-2B, the backlight unit 1000 includes, for example, a substrate 100, a plurality of first light sources 310, a plurality of second light sources 320, a first wiring portion, a second wiring portion, a first connector 210 and a second connector 220. The substrate 100 is extended, for example, in a length direction thereof. Thus, the substrate 100 corresponds to one of side walls of the backlight unit 1000.

The first light sources 310 are disposed on the substrate 100 in, for example, a single line. The second light sources 320 are disposed on the substrate 100 in, for example, a single line to be arranged alternatively with the first light sources 310. The first wring portion is electrically connected to the second light sources 320. The second wiring portion is electrically connected to the second light sources 320. The first connector 210 is disposed at a first end portion of the substrate 100 to be electrically connected to the first wiring portion, and the second connector 220 is disposed at a second end portion of the substrate 100 to be electrically connected to the second wiring portion.

The first light sources 310 and the second light sources 320 emit lights toward, for example, a central portion of the bottom chassis 2000. An additional light guide part is installed at the central portion of the bottom chassis 2000 to provide the liquid crystal display panel 3000 with lights.

Figure 5A:
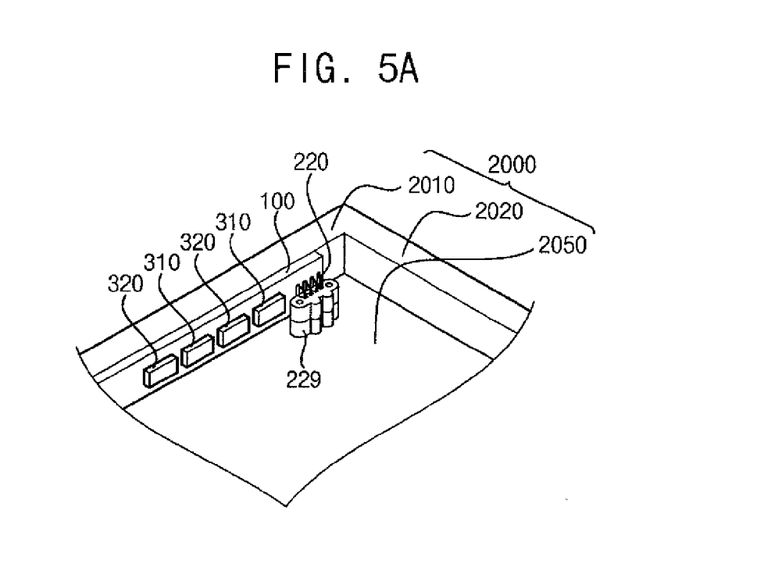
FIG. 5A is a partial perspective view partially illustrating one portion of the display device of FIG. 4.
Figure 5B:
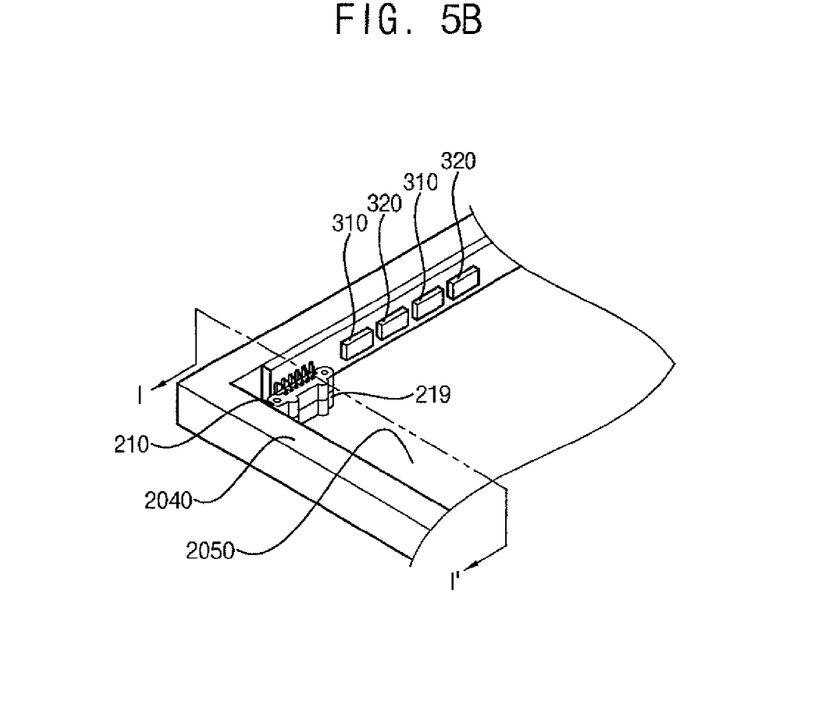
FIG. 5B is a partial perspective view illustrating another portion of the display device of FIG. 4.
Figure 5C:
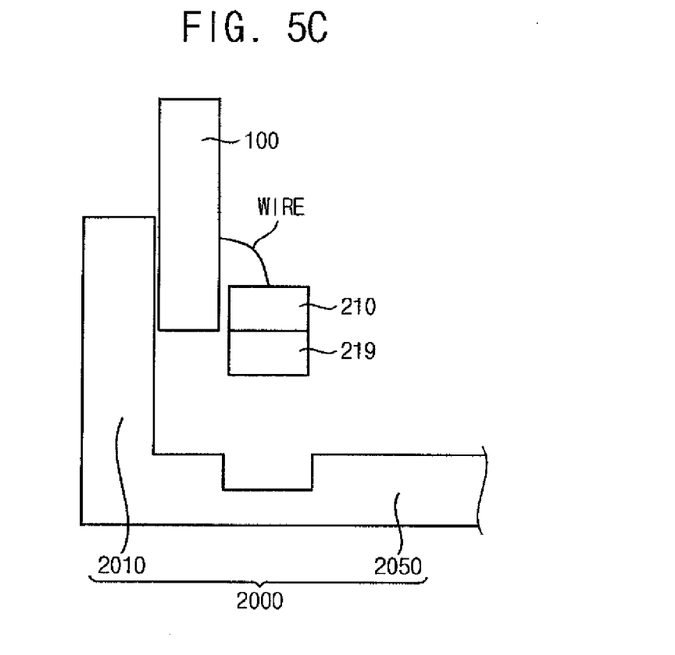
FIGS. 5C and 5D are cross-sectional views taken along a line I-I' of FIG. 5B.
Figure 5D:
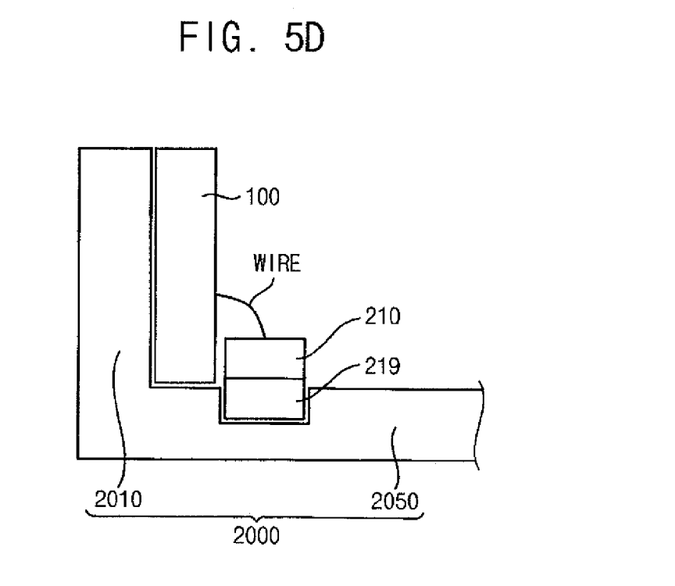

FIG. 5A is a partial perspective view partially illustrating one portion of the display device of FIG. 4. FIG. 5B is a partial perspective view illustrating another portion of the display device of FIG. 4. FIGS. 5C and 5D are cross-sectional views taken along a line I-I' of FIG. 5B. Particularly, FIG. 5C schematically shows a status before a substrate 100 having a first socket 219 and a first connector 210 is combined to a bottom chassis 2000, and FIG. 5D schematically shows a status after a substrate 100 having a first socket 219 and a first connector 210 is combined to a bottom chassis 2000.

Referring to FIGS. 5A, 5B, 5C and 5D, a bottom portion 2050 of the bottom chassis 2000 includes, for example, a first socket 219 combined with a first connector 210 of the backlight unit 1000 and a second socket 229 combined with a second connector 220 of the backlight unit 1000. The first and second sockets 219 and 229 are disposed, for example, at two corners of side wall portion 2010 of the bottom chassis 2000.

The first socket 219 and the second socket 229 are formed, for example, on a bottom portion 2050 adjacent to a side wall portion 2010 of the bottom chassis 2000. The first socket 219 and the second socket 229 may, for example, be recessed from a bottom surface 2050 of the bottom chassis 2000. The first socket 219 and the second socket 229 are, for example, recessed from the bottom portion 2050 of the bottom chassis 2000, so that the backlight unit 1000 may be positioned at a whole side wall of the bottom chassis 2000 even through the first socket 219 and the second socket 229 are coupled with the first connector 210 and the second connector 220 that are protruded from the backlight unit 1000.

Referring to FIGS. 5A and 5B, the backlight unit 1000 wholly covers a first side wall portion 2010 of the bottom chassis 2000. In the backlight unit 1000, plural side walls are formed. When the backlight unit 1000 is disposed at one side wall of the bottom chassis 2000, the backlight unit 1000 may be disposed at a side wall having a long side.

According to exemplary embodiments of the present invention, different kinds of light sources are disposed on one substrate in a single line to be arranged alternatively with each other, so that a backlight unit of the substrate having a slim width may be manufactured.

Moreover, according to exemplary embodiments of the present invention, the number of pins of the first connector is different from that of pins of the second connector, so that a miss-assembling which may be generated in an assembly process of the backlight unit may be prevented.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A backlight unit comprising:
a single substrate extending along a length direction;
a plurality of first light sources disposed on the substrate;
a plurality of second light sources disposed on the substrate, wherein plurality of first and second light sources are disposed on the substrate in a line of lights in which each of the plurality of first lights and each of the plurality of second lights are alternately arranged with respect to each other;
a first wiring portion extending along the length direction on a first peripheral area of the substrate and connected to the first light sources, the first wiring portion, electrically connected to, and terminating at a first connector disposed at a first end portion of the substrate, the first connector electrically connecting the first wiring portion to a first socket that is external to the substrate, the first connector being an only electrical connection of the first wiring portion off of the substrate; and
a second wiring portion extending along the length direction on a second peripheral area of the substrate and connected to the second light sources, the second wiring portion, electrically connected to, and terminating at a second connector disposed at a second end portion of the substrate, the second connector electrically connecting the second wiring portion to a second socket that is external to the substrate, the second connector being an only electrical connection of the second wiring portion off of the substrate,
wherein the first end portion of the substrate is opposite to the second end portion of the substrate with respect to the length direction thereof.

2. The backlight unit of claim 1, wherein the first light sources and the second light sources are disposed on the first peripheral area and the second peripheral area, respectively.

3. The backlight unit of claim 1, wherein the first connector and the second connector each include a plurality of pins and wherein a number of the pins of the first connector is different from a number of the pins of the second connector.

4. The backlight unit of claim 1, wherein the first connector and the second connector each include a plurality of pins and wherein a number of the pins of the first connector is greater than a number of the pins of the second connector.

5. The backlight unit of claim 3, wherein the number of the first light sources is integer multiple of the number of pins of the first connector, and the number of the second light sources is integer multiple of the number of pins of the second connector.

6. The backlight unit of claim 3, wherein the substrate comprises a first connector protruding portion and a second connector protruding portion, and wherein each of the first connector and the second connector are disposed on the first connector protruding portion and the second connector protruding portion, respectively, and wherein the first connector and the second connector protrude from the substrate.

7. The backlight unit of claim 1, wherein the first light sources are the first and the last light sources in a row on the substrate on which the first light sources and the second light sources are disposed.

8. The backlight unit of claim 7, wherein the first light source emits magenta lights, and the second light source emits green lights.

9. The backlight unit of claim 1, wherein one of the first wiring portion and the second wiring portion comprises a plurality of main wirings and a plurality of sub-wirings, and wherein the sub-wirings connect the first light sources to each other or connect the second light sources to each other in a serial manner.

10. A display device comprising:
a top chassis;
a liquid crystal display panel configured to display an image; and
a bottom chassis combined with the top chassis to receive the liquid crystal display panel, a backlight unit disposed on at least one of a bottom portion, plural side wall portion and a side wall portion of the bottom chassis, the backlight unit comprising:
a single substrate extending along a length direction;
a plurality of first light sources disposed on the substrate;
a plurality of second light sources disposed on the substrate, wherein plurality of first and second light sources are disposed on the substrate in a line of lights in which each of the plurality of first lights and each of the plurality of second lights are alternately arranged with respect to each other;
a first wiring portion extending along the length direction on a first peripheral area of the substrate and connected to the first light sources, the first wiring portion, electrically connected to, and terminating at a first connector disposed at a first end portion of the substrate, the first connector electrically connecting the first wiring portion to a first socket of the bottom chassis, the first connector being an only electrical connection between the first wiring portion and the bottom chassis; and
a second wiring portion extending along the length direction on a second peripheral area of the substrate and connected to the second light sources, the second wiring portion, electrically connected to, and terminating at a second connector disposed at a second end portion of the substrate, the second connector electrically connecting the second wiring portion to a second socket of the bottom chassis, the second connector being an only electrical connection between the second wiring portion and the bottom chassis,
wherein the first end portion of the substrate is opposite to the second end portion of the substrate with respect to the length direction thereof.

11. The display device of claim 10, wherein the first socket and the second socket are disposed at two corners of the side wall portion of the bottom chassis.

12. The display device of claim 10, wherein a substrate of the backlight unit comprises a first connector protruding portion and a second connector protruding portion, wherein each of the first connector and the second connector are disposed on the first connector protruding portion and the second connector protruding portion, respectively, and the first connector and the second connector protrude from the substrate, and wherein the first socket and the second socket of the bottom chassis are recessed from a bottom surface of the bottom chassis.

13. The display device of claim 10, wherein the backlight unit is disposed on the side wall portion of the bottom chassis.

14. The display device of claim 10, wherein the first connector and the second connector each include a plurality of pins and wherein a number of the pins of the first connector of the backlight unit is greater than a number of the pins of the second connector of the backlight unit.

15. The display device of claim 14, wherein a number of the first light sources is integer multiple of the number of the pins of the first connector, and a number of the second light sources is integer multiple of the number of the pins of the second connector.

16. The display device of claim 10, wherein the first light sources are the first and the last light sources in a row on the substrate on which the first light sources and the second light sources are disposed.

17. The display device of claim 16, wherein the first light source emits magenta lights, and the second light source emits green lights.

18. The display device of claim 10, wherein one of the first wiring portion and the second wiring portion comprises a plurality of main wirings and a plurality of sub-wirings, and wherein the sub-wirings connect the first light sources to each other or connect the second light sources to each other in a serial manner.

19. A backlight unit comprising:
a single substrate extending along a length direction, wherein the substrate includes a first peripheral area, a second peripheral area and a light source area;
a plurality of first light sources disposed on the light source area of the substrate;
a plurality of second light sources disposed on the light source area of the substrate, wherein plurality of first and second light sources are disposed on the substrate in a line of lights in which each of the plurality of first lights and each of the plurality of second lights are alternately arranged with respect to each other;
a first wiring portion disposed on the first peripheral area of the substrate, wherein the first wiring portion includes a plurality of first main wirings extending along the length direction of the first peripheral area and a plurality of first sub-wirings electrically connected to the first main wirings and the first light sources, wherein the first light sources are electrically connected to the first sub-wirings through a plurality of first connection pads, the first wiring portion, electrically connected to, and terminating at a first connector disposed at a first end portion of the substrate, the first connector electrically connecting the first wiring portion to a first socket that is external to the substrate, the first connector being an only electrical connection of the first wiring portion off of the substrate; and
a second wiring portion disposed on the second peripheral area of the substrate, wherein the second wiring portion includes a plurality of second main wirings extending along the length direction of the second peripheral area and a plurality of second sub-wirings electrically connected to the second main wirings and the second light sources, wherein the second light sources are electrically connected to the second sub-wirings through a plurality of second connection pads, the second wiring portion, electrically connected to, and terminating at a second connector disposed at a second end portion of the substrate, the second connector electrically connecting the second wiring portion to a second socket that is external to the substrate, the second connector being an only electrical connection of the second wiring portion off of the substrate, wherein the first end portion of the substrate is opposite to the second end portion of the substrate with respect to the length direction thereof.

20. The backlight unit of claim 19, wherein the first connector connection part and the second connector connection part each include a plurality of connector pads.

21. The backlight unit of claim 20, wherein a number of the connector pads of the first connector connection part is six and a number of the connector pads of the second connector connection part is four.

22. The backlight unit of claim 19, wherein the second peripheral area is disposed on an upper portion of the light source area and the first peripheral area is disposed on a lower portion of the light source area.

23. The backlight unit of claim 19, wherein the first connector and the second connector each include a housing part and a pin part located within housing part.

* * * * *